United States Patent
Willis

(10) Patent No.: US 7,245,327 B2
(45) Date of Patent: Jul. 17, 2007

(54) PULSE WIDTH MODULATED DISPLAY WITH EQUALIZED PULSE WIDTH SEGMENTS

(75) Inventor: Donald Henry Willis, Indianapolis, IN (US)

(73) Assignee: Thomson Licensing, Boulogne-Billancourt (FR)

(*) Notice: Subject to any disclaimer, the term of this patent is extended or adjusted under 35 U.S.C. 154(b) by 0 days.

(21) Appl. No.: 10/537,113

(22) PCT Filed: Jul. 7, 2003

(86) PCT No.: PCT/US03/21155
§ 371 (c)(1),
(2), (4) Date: Mar. 7, 2006

(87) PCT Pub. No.: WO2004/054252
PCT Pub. Date: Jun. 24, 2004

(65) Prior Publication Data
US 2006/0203134 A1 Sep. 14, 2006

Related U.S. Application Data

(60) Provisional application No. 60/430,751, filed on Dec. 4, 2002.

(51) Int. Cl.
H04N 5/74 (2006.01)
H04N 9/12 (2006.01)
(52) U.S. Cl. .................. 348/771; 348/743; 348/760
(58) Field of Classification Search ............... 348/771, 348/743, 760, 739, 742, 759, 764; 345/690–693, 345/108, 31; H04N 5/74, 9/12, 9/31
See application file for complete search history.

(56) References Cited

U.S. PATENT DOCUMENTS

| 5,909,204 | A | 6/1999 | Gale et al. |
| 6,108,053 | A | 8/2000 | Pettitt et al. |
| 6,246,185 | B1 | 6/2001 | Parks |
| 6,362,835 | B1 | 3/2002 | Urbanus et al. |

FOREIGN PATENT DOCUMENTS

EP 0762375 A2 3/1997

OTHER PUBLICATIONS

Search Report Dated Dec. 13, 2003.

*Primary Examiner*—Sherrie Hsia
(74) *Attorney, Agent, or Firm*—Joseph J. Laks; Harvey D. Fried

(57) ABSTRACT

A field sequential pulse width modulated display system comprises a digital micromirror device having a plurality of micromirrors that each selectively pivot to reflect light onto a screen to illuminate a corresponding pixel. A driver circuit controls the DMD responsive to sequences of pulse width segments formed by a processor. The processor alters the actuation state of at least one pulse in a first pulse width segment for a given color to alter the pixel brightness with a range lying between first and second pixel brightness boundaries. Further, the processor alters the actuation state of at least one pulse within at least one additional pulse width segment to alter the pixel brightness above the second brightness boundary to make nearly equal the total width of pulses becoming actuated within a segment to the total pulse width becoming de-actuated within the same segment to achieve an incremental change in brightness. Equalizing the weight of the total duration of actuated pulses to non-actuated pulses on a segment by segment basis serves to reduce motion artifacts attributable to light redistribution effects on intensity gradients.

17 Claims, 9 Drawing Sheets

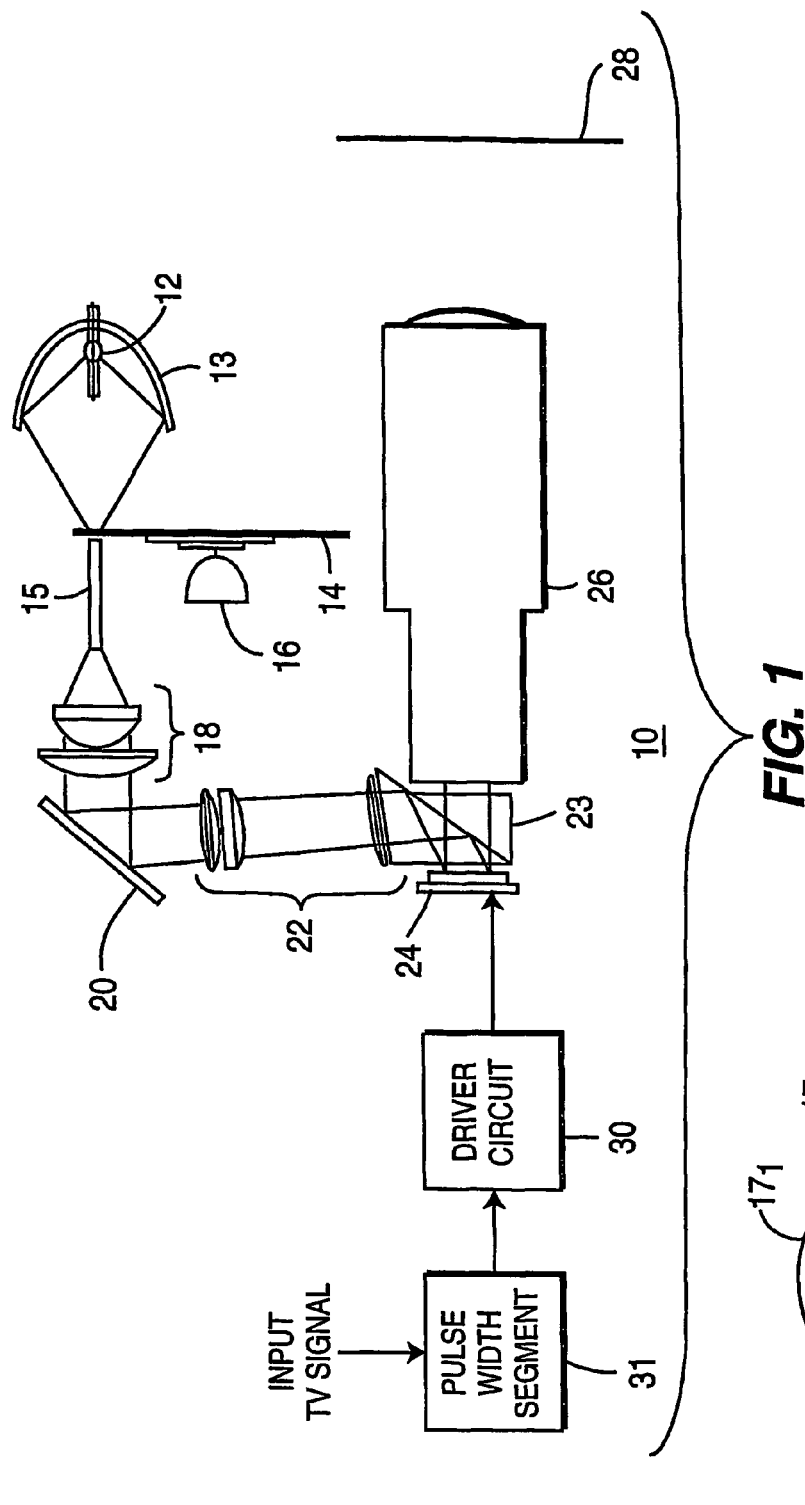

| Combinations | Segment 1 | | | | | | | | Segment 2 | | | | | | | | Segment 3 | | | | | | | | Segment 4 | | | | | | | | |
|---|---|---|---|---|---|---|---|---|---|---|---|---|---|---|---|---|---|---|---|---|---|---|---|---|---|---|---|---|---|---|---|---|---|
| | 10 | 1 | 12 | 1 | 16 | 2 | 8 | 4 | 10 | 9 | 1 | 10 | 4 | 10 | 2 | 8 | 8 | 8 | 4 | 16 | 2 | 16 | 1 | 8 | 8 | 10 | 1 | 12 | 1 | 16 | 2 | 8 | 4 | 10 | 25 |
| | B,D,J,K,M,R,AA,AC,AI | C,L,AB | B,D,J,K,M,R,AA,AC,AI | | F,M,A,E | G,P,A,F | H,Q,A,G | I,P,A,F | B,D,J,K,M,R,AA,AC,AI | B,D,J,K,M,R,AA,AC,AI | C,L,AB | C,F,M,A,E | C,M,A,A | F,N,A,D | I,P,A,F | H,Q,A,G | B,D,J,K,M,R,AA,AC,AI | S,U,Z | | S,U,Z | | | | | S,U,Z | B,D,J,K,M,R,AA,AC,AI | C,L,AB | B,D,J,K,M,R,AA,AC,AI | | F,M,A,E | I,P,A,F | H,Q,L,A,G | H,R,A,A,F | B,D,J,K,M,R,AA,AC,AI | |
| 35 | | | | | | | | | | | | | | | | | | 8 | | 16 | 2 | | 1 | 8 | | | | | | | | | | | 35 |
| 36 | | | | | | | | | | | | | | | | | | 8 | 4 | 16 | | | | 8 | | | | | | | | | | | 36 |
| 37 | | | | | | | | | | | | | | | | | | 8 | 4 | 16 | | | 1 | 8 | | | | | | | | | | | 37 |
| 38 | | | | | | | | | | | | | | | | | | 8 | 4 | 16 | 2 | | | 8 | | | | | | | | | | | 38 |
| 39 | | | | | | | | | | | | | | | | | | 8 | 4 | 16 | 2 | | 1 | 8 | | | | | | | | | | | 39 |
| 40 | | | | | | | | | | | | | | | | | | 8 | | 16 | | | | 8 | 8 | | | | | | | | | | 40 |
| 41 | | | | | | | | | | | | | | | | | | 8 | | 16 | | | 1 | 8 | 8 | | | | | | | | | | 41 |
| 42 | | | | | | | | | | | | | | | | | | 8 | | 16 | 2 | | | 8 | 8 | | | | | | | | | | 42 |
| 43 | | | | | | | | | | | | | | | | | | 8 | | 16 | 2 | | 1 | 8 | 8 | | | | | | | | | | 43 |
| 44 | | | | | | | | | | | | | | | | | | 8 | 4 | 16 | | | | 8 | 8 | | | | | | | | | | 44 |
| 45 | | | | | | | | | | | | | | | | | | 8 | 4 | 16 | | | 1 | 8 | 8 | | | | | | | | | | 45 |
| 46 | | | | | | | | | | | | | | | | | | 8 | 4 | 16 | 2 | | | 8 | 8 | | | | | | | | | | 46 |
| 47 | | | | | | | | | | | | | | | | | | 8 | 4 | 16 | 2 | | 1 | 8 | 8 | | | | | | | | | | 47 |
| 48 | | | | | | | | | | | | | | | | | | 8 | | 16 | | 16 | | 8 | | | | | | | | | | | 48 |
| 49 | | | | | | | | | | | | | | | | | | 8 | | 16 | | 16 | 1 | 8 | | | | | | | | | | | 49 |
| 50 | | | | | | | | | | | | | | | | | | 8 | | 16 | 2 | 16 | | 8 | | | | | | | | | | | 50 |
| 51 | | | | | | | | | | | | | | | | | | 8 | | 16 | 2 | 16 | 1 | 8 | | | | | | | | | | | 51 |
| 52 | | | | | | | | | | | | | | | | | | 8 | 4 | 16 | | 16 | | 8 | | | | | | | | | | | 52 |
| 53 | | | | | | | | | | | | | | | | | | 8 | 4 | 16 | | 16 | 1 | 8 | | | | | | | | | | | 53 |
| 54 | | | | | | | | | | | | | | | | | | 8 | 4 | 16 | 2 | 16 | | 8 | | | | | | | | | | | 54 |
| 55 | | | | | | | | | | | | | | | | | | 8 | 4 | 16 | 2 | 16 | 1 | 8 | | | | | | | | | | | 55 |
| 56 | | | | | | | | | | | | | | | | | | 8 | | 16 | | 16 | | 8 | 8 | | | | | | | | | | 56 |
| 57 | | | | | | | | | | | | | | | | | | 8 | | 16 | | 16 | 1 | 8 | 8 | | | | | | | | | | 57 |
| 58 | | | | | | | | | | | | | | | | | | 8 | | 16 | 2 | 16 | | 8 | 8 | | | | | | | | | | 58 |
| 59 | | | | | | | | | | | | | | | | | | 8 | | 16 | 2 | 16 | 1 | 8 | 8 | | | | | | | | | | 59 |
| 60 | | | | | | | | | | | | | | | | | | 8 | 4 | 16 | | 16 | | 8 | 8 | | | | | | | | | | 60 |
| 61 | | | | | | | | | | | | | | | | | | 8 | 4 | 16 | | 16 | 1 | 8 | 8 | | | | | | | | | | 61 |
| 62 | | | | | | | | | | | | | | | | | | 8 | 4 | 16 | 2 | 16 | | 8 | 8 | | | | | | | | | | 62 |
| 63 | | | | | | | | | | | | | | | | | | 8 | 4 | 16 | 2 | 16 | 1 | 8 | 8 | | | | | | | | | | 63 |
| 64 | | | | | | | | | | | | | | | | | | 8 | 4 | 16 | 2 | 16 | 1 | 8 | 8 | | | | | 1 | | | | | 64 |
| 65 | | | 1 | | | | | | | | | | | | | | | 8 | 4 | 16 | 2 | 16 | 1 | 8 | 8 | | | | | 1 | | | | | 65 |
| 66 | | 1 | | | | | | | | | 1 | | | | | | | 8 | 4 | 16 | 2 | 16 | 1 | 8 | 8 | | 1 | | | | | | | | 66 |
| 67 | | 1 | | | | | | | | | 1 | | | | | | | 8 | 4 | 16 | 2 | 16 | 1 | 8 | 8 | | 1 | | 1 | | | | | | 67 |
| 68 | 0 | 1 | 0 | 1 | 0 | 0 | 0 | 0 | 0 | 1 | 0 | | | | | | 0 | 8 | 4 | 16 | 2 | 16 | 1 | 8 | 8 | 0 | 1 | 0 | 1 | 0 | 0 | 0 | 0 | 0 | 68 |

| Combinations | Segment 1 | | | | | | | | Segment 2 | | | | | | | | Segment 3 | | | | | | | | Segment 4 | | | | | | | | |
|---|---|---|---|---|---|---|---|---|---|---|---|---|---|---|---|---|---|---|---|---|---|---|---|---|---|---|---|---|---|---|---|---|---|
| | 10 | 1 | 12 | 1 | 16 | 2 | 8 | 4 | 10 | 9 | 1 | 10 | 4 | 10 | 2 | 8 | 8 | 8 | 4 | 16 | 2 | 16 | 1 | 8 | 8 | 10 | 1 | 12 | 1 | 16 | 2 | 8 | 4 | 10 | 25 |
| | B,D,J,K,M,R,AA,AC,AI | C,L,AB | B,D,J,K,M,R,AA,AC,AI | | F,M,A,E | G,P,A,F | H,Q,A,G | I,P,A,F | B,D,J,K,M,R,AA,AC,AI | B,D,J,K,M,R,AA,AC,AI | C,L,A,B | C,F,M,A,E | C,M,N,A,A | F,N,A,D | I,P,A,F | H,Q,A,G | B,D,J,K,M,R,AA,AC,AI | S,U,Z | S,U,Z | | | | | | S,U,Z | B,D,J,K,M,R,AA,AC,AI | C,L,A,B | B,D,J,K,M,R,AA,AC,AI | | F,M,A,E | I,P,A,F | H,Q,A,G | H,L,A,F | B,D,J,K,M,R,AA,AC,AI | |
| 137 | 0 | 0 | 0 | 1 | 16 | 0 | 8 | 0 | | 0 | | 0 | | 16 | | 8 | 0 | 8 | 4 | 16 | 2 | 16 | 1 | 8 | 8 | 0 | 0 | 0 | 1 | 16 | 0 | 8 | 4 | 0 | 137 |
| 138 | 0 | 1 | 0 | | 16 | 0 | 8 | 0 | | 0 | 1 | 0 | | 16 | | 8 | 0 | 8 | 4 | 16 | 2 | 16 | 1 | 8 | 8 | 0 | 1 | 0 | | 16 | 0 | 8 | 4 | 0 | 138 |
| 139 | 0 | 1 | 0 | | 16 | 0 | 8 | 0 | | 0 | 1 | 0 | | 16 | | 8 | 0 | 8 | 4 | 16 | 2 | 16 | 1 | 8 | 8 | 0 | 1 | 0 | 1 | 16 | 0 | 8 | 4 | 0 | 139 |
| 140 | 0 | 1 | 0 | 1 | 16 | 0 | 8 | 0 | | 0 | 1 | 0 | | 16 | | 8 | 0 | 8 | 4 | 16 | 2 | 16 | 1 | 8 | 8 | 0 | 1 | 0 | 1 | 16 | 0 | 8 | 4 | 0 | 140 |
| 141 | 0 | 0 | 0 | | 16 | 2 | 8 | 0 | | 0 | | 0 | | 16 | 2 | 8 | 0 | 8 | 4 | 16 | 2 | 16 | 1 | 8 | 8 | 0 | 0 | 0 | | 16 | 2 | 8 | 4 | 0 | 141 |
| 142 | 0 | 0 | 0 | | 16 | 2 | 8 | 0 | | 0 | | 0 | | 16 | 2 | 8 | 0 | 8 | 4 | 16 | 2 | 16 | 1 | 8 | 8 | 0 | 0 | 0 | 1 | 16 | 2 | 8 | 4 | 0 | 142 |
| 143 | 0 | 0 | 0 | 1 | 16 | 2 | 8 | 0 | | 0 | | 0 | | 16 | 2 | 8 | 0 | 8 | 4 | 16 | 2 | 16 | 1 | 8 | 8 | 0 | 0 | 0 | 1 | 16 | 2 | 8 | 4 | 0 | 143 |
| 144 | 0 | 1 | 0 | | 16 | 2 | 8 | 0 | | 0 | 1 | 0 | | 16 | 2 | 8 | 0 | 8 | 4 | 16 | 2 | 16 | 1 | 8 | 8 | 0 | 1 | 0 | | 16 | 2 | 8 | 4 | 0 | 144 |
| 145 | 0 | 1 | 0 | | 16 | 2 | 8 | 0 | | 0 | 1 | 0 | | 16 | 2 | 8 | 0 | 8 | 4 | 16 | 2 | 16 | 1 | 8 | 8 | 0 | 1 | 0 | 1 | 16 | 2 | 8 | 4 | 0 | 145 |
| 146 | 0 | 1 | 0 | 1 | 16 | 2 | 8 | 0 | | 0 | 1 | 0 | | 16 | 2 | 8 | 0 | 8 | 4 | 16 | 2 | 16 | 1 | 8 | 8 | 0 | 1 | 0 | 1 | 16 | 2 | 8 | 4 | 0 | 146 |
| 147 | 0 | 0 | 0 | | 16 | 0 | 8 | 4 | | 0 | | 0 | 4 | 16 | | 8 | 0 | 8 | 4 | 16 | 2 | 16 | 1 | 8 | 8 | 0 | 0 | 0 | | 16 | 0 | 8 | 4 | 0 | 147 |
| 148 | 0 | 0 | 0 | | 16 | 0 | 8 | 4 | | 0 | | 0 | 4 | 16 | | 8 | 0 | 8 | 4 | 16 | 2 | 16 | 1 | 8 | 8 | 0 | 0 | 0 | 1 | 16 | 0 | 8 | 4 | 0 | 148 |
| 149 | 0 | 0 | 0 | 1 | 16 | 0 | 8 | 4 | | 0 | | 0 | 4 | 16 | | 8 | 0 | 8 | 4 | 16 | 2 | 16 | 1 | 8 | 8 | 0 | 0 | 0 | 1 | 16 | 0 | 8 | 4 | 0 | 149 |
| 150 | 0 | 1 | 0 | | 16 | 0 | 8 | 4 | | 0 | 1 | 0 | 4 | 16 | | 8 | 0 | 8 | 4 | 16 | 2 | 16 | 1 | 8 | 8 | 0 | 1 | 0 | | 16 | 0 | 8 | 4 | 0 | 150 |
| 151 | 0 | 1 | 0 | | 16 | 0 | 8 | 4 | | 0 | 1 | 0 | 4 | 16 | | 8 | 0 | 8 | 4 | 16 | 2 | 16 | 1 | 8 | 8 | 0 | 1 | 0 | 1 | 16 | 0 | 8 | 4 | 0 | 151 |
| 152 | 0 | 1 | 0 | 1 | 16 | 0 | 8 | 4 | | 0 | 1 | 0 | 4 | 16 | | 8 | 0 | 8 | 4 | 16 | 2 | 16 | 1 | 8 | 8 | 0 | 1 | 0 | 1 | 16 | 0 | 8 | 4 | 0 | 152 |
| 153 | 0 | 0 | 0 | | 16 | 2 | 8 | 4 | | 0 | | 0 | 4 | 16 | 2 | 8 | 0 | 8 | 4 | 16 | 2 | 16 | 1 | 8 | 8 | 0 | 0 | 0 | | 16 | 2 | 8 | 4 | 0 | 153 |
| 154 | 0 | 0 | 0 | | 16 | 2 | 8 | 4 | | 0 | | 0 | 4 | 16 | 2 | 8 | 0 | 8 | 4 | 16 | 2 | 16 | 1 | 8 | 8 | 0 | 0 | 0 | 1 | 16 | 2 | 8 | 4 | 0 | 154 |
| 155 | 0 | 0 | 0 | 1 | 16 | 2 | 8 | 4 | | 0 | | 0 | 4 | 16 | 2 | 8 | 0 | 8 | 4 | 16 | 2 | 16 | 1 | 8 | 8 | 0 | 0 | 0 | 1 | 16 | 2 | 8 | 4 | 0 | 155 |
| 156 | 0 | 1 | 0 | | 16 | 2 | 8 | 4 | | 0 | 1 | 0 | 4 | 16 | 2 | 8 | 0 | 8 | 4 | 16 | 2 | 16 | 1 | 8 | 8 | 0 | 1 | 0 | | 16 | 2 | 8 | 4 | 0 | 156 |
| 157 | 0 | 1 | 0 | | 16 | 2 | 8 | 4 | | 0 | 1 | 0 | 4 | 16 | 2 | 8 | 0 | 8 | 4 | 16 | 2 | 16 | 1 | 8 | 8 | 0 | 1 | 0 | 1 | 16 | 2 | 8 | 4 | 0 | 157 |
| 158 | 0 | 1 | 0 | 1 | 16 | 2 | 8 | 4 | | 0 | 1 | 0 | 4 | 16 | 2 | 8 | 0 | 8 | 4 | 16 | 2 | 16 | 1 | 8 | 8 | 0 | 1 | 0 | 1 | 16 | 2 | 8 | 4 | 0 | 158 |
| 159 | 10 | 0 | 12 | | 0 | 0 | 0 | 0 | 10 | 9 | | 16 | | | | | 8 | 8 | 4 | 16 | 2 | 16 | | 8 | 8 | 10 | 0 | 12 | | 0 | 0 | 0 | 0 | 10 | 159 |
| 160 | 10 | 0 | 12 | | 0 | 0 | 0 | 0 | 10 | 9 | | 16 | | | | | 8 | 8 | 4 | 16 | 2 | 16 | | 8 | 8 | 10 | 0 | 12 | 1 | 0 | 0 | 0 | 0 | 10 | 160 |
| 161 | 10 | 0 | 12 | 1 | 0 | 0 | 0 | 0 | 10 | 9 | | 16 | | | | | 8 | 8 | 4 | 16 | 2 | 16 | | 8 | 8 | 10 | 0 | 12 | 1 | 0 | 0 | 0 | 0 | 10 | 161 |
| 162 | 10 | 1 | 12 | | 0 | 0 | 0 | 0 | 10 | 9 | 1 | 16 | | | | | 8 | 8 | 4 | 16 | 2 | 16 | | 8 | 8 | 10 | 1 | 12 | | 0 | 0 | 0 | 0 | 10 | 162 |
| 163 | 10 | 1 | 12 | | 0 | 0 | 0 | 0 | 10 | 9 | 1 | 16 | | | | | 8 | 8 | 4 | 16 | 2 | 16 | | 8 | 8 | 10 | 1 | 12 | 1 | 0 | 0 | 0 | 0 | 10 | 163 |
| 164 | 10 | 1 | 12 | 1 | 0 | 0 | 0 | 0 | 10 | 9 | 1 | 16 | | | | | 8 | 8 | 4 | 16 | 2 | 16 | | 8 | 8 | 10 | 1 | 12 | 1 | 0 | 0 | 0 | 0 | 10 | 164 |
| 165 | 10 | 0 | 12 | | 0 | 2 | 0 | 0 | 10 | 9 | | 16 | | | 2 | | 8 | 8 | 4 | 16 | 2 | 16 | | 8 | 8 | 10 | 0 | 12 | | 0 | 2 | 0 | 0 | 10 | 165 |
| 166 | 10 | 0 | 12 | | 0 | 2 | 0 | 0 | 10 | 9 | | 16 | | | 2 | | 8 | 8 | 4 | 16 | 2 | 16 | | 8 | 8 | 10 | 0 | 12 | 1 | 0 | 2 | 0 | 0 | 10 | 166 |
| 167 | 10 | 0 | 12 | 1 | 0 | 2 | 0 | 0 | 10 | 9 | | 16 | | | 2 | | 8 | 8 | 4 | 16 | 2 | 16 | | 8 | 8 | 10 | 0 | 12 | 1 | 0 | 2 | 0 | 0 | 10 | 167 |
| 168 | 10 | 1 | 12 | | 0 | 2 | 0 | 0 | 10 | 9 | 1 | 16 | | | 2 | | 8 | 8 | 4 | 16 | 2 | 16 | | 8 | 8 | 10 | 1 | 12 | | 0 | 2 | 0 | 0 | 10 | 168 |
| 169 | 10 | 1 | 12 | | 0 | 2 | 0 | 0 | 10 | 9 | 1 | 16 | | | 2 | | 8 | 8 | 4 | 16 | 2 | 16 | | 8 | 8 | 10 | 1 | 12 | 1 | 0 | 2 | 0 | 0 | 10 | 169 |
| 170 | 10 | 1 | 12 | 1 | 0 | 2 | 0 | 0 | 10 | 9 | 1 | 16 | | | 2 | | 8 | 8 | 4 | 16 | 2 | 16 | | 8 | 8 | 10 | 1 | 12 | 1 | 0 | 2 | 0 | 0 | 10 | 170 |

FIG. 8

| Combinations | Segment 1 | | | | | | | | | Segment 2 | | | | | | | | Segment 3 | | | | | | | Segment 4 | | | | | | | | |
|---|---|---|---|---|---|---|---|---|---|---|---|---|---|---|---|---|---|---|---|---|---|---|---|---|---|---|---|---|---|---|---|---|---|
| | 10 | 1 | 12 | 1 | 16 | 2 | 8 | 4 | 10 | 9 | 1 | 10 | 4 | 10 | 2 | 8 | 8 | 8 | 4 | 16 | 2 | 16 | 1 | 8 | 8 | 10 | 1 | 12 | 1 | 16 | 2 | 8 | 4 | 10 | 25 |
| | B,D,J,K,M,R,AA,AC,AI | C,L,AB | B,D,J,K,M,R,AA,AC,AI | | F,M,A,E | G,P,A,F | H,Q,A,G | I,P,A,F | B,D,J,K,M,R,AA,AC,AI | B,D,J,K,M,R,AA,AC,AI | | C,F,M,A,E | C,L,A,B | F,M,A,D | I,P,A,F | H,Q,A,G | B,D,J,K,M,R,AA,AC,AI | S,U,Z | S,U,Z | | | | S,U,Z | B,D,J,K,M,R,AA,AC,AI | C,L,A,B | F,M,A,E | I,P,A,F | H,Q,A,G | H,L,A,F | B,D,J,K,M,R,AA,AC,AI | | | | |
| 171 | 10 | 0 | 12 | | 0 | 0 | 0 | 4 | 10 | 9 | | 16 | 4 | | | | 8 | 8 | 4 | 16 | 2 | 16 | | 8 | 8 | 10 | 0 | 12 | | 0 | 0 | 0 | 4 | 10 | 171 |
| 172 | 10 | 0 | 12 | | 0 | 0 | 0 | 4 | 10 | 9 | | 16 | 4 | | | | 8 | 8 | 4 | 16 | 2 | 16 | | 8 | 8 | 10 | 0 | 12 | 1 | 0 | 0 | 0 | 4 | 10 | 172 |
| 173 | 10 | 0 | 12 | 1 | 0 | 0 | 0 | 4 | 10 | 9 | | 16 | 4 | | | | 8 | 8 | 4 | 16 | 2 | 16 | | 8 | 8 | 10 | 0 | 12 | 1 | 0 | 0 | 0 | 4 | 10 | 173 |
| 174 | 10 | 1 | 12 | | 0 | 0 | 0 | 4 | 10 | 9 | 1 | 16 | 4 | | | | 8 | 8 | 4 | 16 | 2 | 16 | | 8 | 8 | 10 | 1 | 12 | | 0 | 0 | 0 | 4 | 10 | 174 |
| 175 | 10 | 1 | 12 | | 0 | 0 | 0 | 4 | 10 | 9 | 1 | 16 | 4 | | | | 8 | 8 | 4 | 16 | 2 | 16 | | 8 | 8 | 10 | 1 | 12 | 1 | 0 | 0 | 0 | 4 | 10 | 175 |
| 176 | 10 | 1 | 12 | 1 | 0 | 0 | 0 | 4 | 10 | 9 | 1 | 16 | 4 | | | | 8 | 8 | 4 | 16 | 2 | 16 | | 8 | 8 | 10 | 1 | 12 | 1 | 0 | 0 | 0 | 4 | 10 | 176 |
| 177 | 10 | 0 | 12 | | 0 | 2 | 0 | 4 | 10 | 9 | | 16 | 4 | | 2 | | 8 | 8 | 4 | 16 | 2 | 16 | | 8 | 8 | 10 | 0 | 12 | | 0 | 2 | 0 | 4 | 10 | 177 |
| 178 | 10 | 0 | 12 | | 0 | 2 | 0 | 4 | 10 | 9 | | 16 | 4 | | 2 | | 8 | 8 | 4 | 16 | 2 | 16 | | 8 | 8 | 10 | 0 | 12 | 1 | 0 | 2 | 0 | 4 | 10 | 178 |
| 179 | 10 | 0 | 12 | 1 | 0 | 2 | 0 | 4 | 10 | 9 | | 16 | 4 | | 2 | | 8 | 8 | 4 | 16 | 2 | 16 | | 8 | 8 | 10 | 0 | 12 | 1 | 0 | 2 | 0 | 4 | 10 | 179 |
| 180 | 10 | 1 | 12 | | 0 | 2 | 0 | 4 | 10 | 9 | 1 | 16 | 4 | | 2 | | 8 | 8 | 4 | 16 | 2 | 16 | | 8 | 8 | 10 | 1 | 12 | | 0 | 2 | 0 | 4 | 10 | 180 |
| 181 | 10 | 1 | 12 | | 0 | 2 | 0 | 4 | 10 | 9 | 1 | 16 | 4 | | 2 | | 8 | 8 | 4 | 16 | 2 | 16 | | 8 | 8 | 10 | 1 | 12 | 1 | 0 | 2 | 0 | 4 | 10 | 181 |
| 182 | 10 | 1 | 12 | 1 | 0 | 2 | 0 | 4 | 10 | 9 | 1 | 16 | 4 | | 2 | | 8 | 8 | 4 | 16 | 2 | 16 | | 8 | 8 | 10 | 1 | 12 | 1 | 0 | 2 | 0 | 4 | 10 | 182 |
| 183 | 10 | 0 | 12 | | 0 | 0 | 8 | 0 | 10 | 9 | | 16 | | | | 8 | 8 | 8 | 4 | 16 | 2 | 16 | | 8 | 8 | 10 | 0 | 12 | | 0 | 0 | 8 | 0 | 10 | 183 |
| 184 | 10 | 0 | 12 | | 0 | 0 | 8 | 0 | 10 | 9 | | 16 | | | | 8 | 8 | 8 | 4 | 16 | 2 | 16 | | 8 | 8 | 10 | 0 | 12 | 1 | 0 | 0 | 8 | 0 | 10 | 184 |
| 185 | 10 | 0 | 12 | 1 | 0 | 0 | 8 | 0 | 10 | 9 | | 16 | | | | 8 | 8 | 8 | 4 | 16 | 2 | 16 | | 8 | 8 | 10 | 0 | 12 | 1 | 0 | 0 | 8 | 0 | 10 | 185 |
| 186 | 10 | 1 | 12 | | 0 | 0 | 8 | 0 | 10 | 9 | 1 | 16 | | | | 8 | 8 | 8 | 4 | 16 | 2 | 16 | | 8 | 8 | 10 | 1 | 12 | | 0 | 0 | 8 | 0 | 10 | 186 |
| 187 | 10 | 1 | 12 | | 0 | 0 | 8 | 0 | 10 | 9 | 1 | 16 | | | | 8 | 8 | 8 | 4 | 16 | 2 | 16 | | 8 | 8 | 10 | 1 | 12 | 1 | 0 | 0 | 8 | 0 | 10 | 187 |
| 188 | 10 | 1 | 12 | 1 | 0 | 0 | 8 | 0 | 10 | 9 | 1 | 16 | | | | 8 | 8 | 8 | 4 | 16 | 2 | 16 | | 8 | 8 | 10 | 1 | 12 | 1 | 0 | 0 | 8 | 0 | 10 | 188 |
| 189 | 10 | 0 | 12 | | 0 | 2 | 8 | 0 | 10 | 9 | | 16 | | | 2 | 8 | 8 | 8 | 4 | 16 | 2 | 16 | | 8 | 8 | 10 | 0 | 12 | | 0 | 2 | 8 | 0 | 10 | 189 |
| 190 | 10 | 0 | 12 | | 0 | 2 | 8 | 0 | 10 | 9 | | 16 | | | 2 | 8 | 8 | 8 | 4 | 16 | 2 | 16 | | 8 | 8 | 10 | 0 | 12 | 1 | 0 | 2 | 8 | 0 | 10 | 190 |
| 191 | 10 | 0 | 12 | 1 | 0 | 2 | 8 | 0 | 10 | 9 | | 16 | | | 2 | 8 | 8 | 8 | 4 | 16 | 2 | 16 | | 8 | 8 | 10 | 0 | 12 | 1 | 0 | 2 | 8 | 0 | 10 | 191 |
| 192 | 10 | 1 | 12 | | 0 | 2 | 8 | 0 | 10 | 9 | 1 | 16 | | | 2 | 8 | 8 | 8 | 4 | 16 | 2 | 16 | | 8 | 8 | 10 | 1 | 12 | | 0 | 2 | 8 | 0 | 10 | 192 |
| 193 | 10 | 1 | 12 | | 0 | 2 | 8 | 0 | 10 | 9 | 1 | 16 | | | 2 | 8 | 8 | 8 | 4 | 16 | 2 | 16 | | 8 | 8 | 10 | 1 | 12 | 1 | 0 | 2 | 8 | 0 | 10 | 193 |
| 194 | 10 | 1 | 12 | 1 | 0 | 2 | 8 | 0 | 10 | 9 | 1 | 16 | | | 2 | 8 | 8 | 8 | 4 | 16 | 2 | 16 | | 8 | 8 | 10 | 1 | 12 | 1 | 0 | 2 | 8 | 0 | 10 | 194 |
| 195 | 10 | 0 | 12 | | 0 | 0 | 8 | 4 | 10 | 9 | | 16 | 4 | | | | 8 | 8 | 4 | 16 | 2 | 16 | | 8 | 8 | 10 | 0 | 12 | | 0 | 0 | 8 | 4 | 10 | 195 |
| 196 | 10 | 0 | 12 | | 0 | 0 | 8 | 4 | 10 | 9 | | 16 | 4 | | | | 8 | 8 | 4 | 16 | 2 | 16 | | 8 | 8 | 10 | 0 | 12 | 1 | 0 | 0 | 8 | 4 | 10 | 196 |
| 197 | 10 | 0 | 12 | 1 | 0 | 0 | 8 | 4 | 10 | 9 | | 16 | 4 | | | | 8 | 8 | 4 | 16 | 2 | 16 | | 8 | 8 | 10 | 0 | 12 | 1 | 0 | 0 | 8 | 4 | 10 | 197 |
| 198 | 10 | 1 | 12 | | 0 | 0 | 8 | 4 | 10 | 9 | 1 | 16 | 4 | | | | 8 | 8 | 4 | 16 | 2 | 16 | | 8 | 8 | 10 | 1 | 12 | | 0 | 0 | 8 | 4 | 10 | 198 |
| 199 | 10 | 1 | 12 | | 0 | 0 | 8 | 4 | 10 | 9 | 1 | 16 | 4 | | | | 8 | 8 | 4 | 16 | 2 | 16 | | 8 | 8 | 10 | 1 | 12 | 1 | 0 | 0 | 8 | 4 | 10 | 199 |
| 200 | 10 | 1 | 12 | 1 | 0 | 0 | 8 | 4 | 10 | 9 | 1 | 16 | 4 | | | | 8 | 8 | 4 | 16 | 2 | 16 | | 8 | 8 | 10 | 1 | 12 | 1 | 0 | 0 | 8 | 4 | 10 | 200 |
| 201 | 10 | 0 | 12 | | 0 | 2 | 8 | 4 | 10 | 9 | | 16 | 4 | | 2 | 8 | 8 | 8 | 4 | 16 | 2 | 16 | | 8 | 8 | 10 | 0 | 12 | | 0 | 2 | 8 | 4 | 10 | 201 |
| 202 | 10 | 0 | 12 | | 0 | 2 | 8 | 4 | 10 | 9 | | 16 | 4 | | 2 | 8 | 8 | 8 | 4 | 16 | 2 | 16 | | 8 | 8 | 10 | 0 | 12 | 1 | 0 | 2 | 8 | 4 | 10 | 202 |
| 203 | 10 | 0 | 12 | 1 | 0 | 2 | 8 | 4 | 10 | 9 | | 16 | 4 | | 2 | 8 | 8 | 8 | 4 | 16 | 2 | 16 | | 8 | 8 | 10 | 0 | 12 | 1 | 0 | 2 | 8 | 4 | 10 | 203 |
| 204 | 10 | 1 | 12 | | 0 | 2 | 8 | 4 | 10 | 9 | 1 | 16 | 4 | | 2 | 8 | 8 | 8 | 4 | 16 | 2 | 16 | | 8 | 8 | 10 | 1 | 12 | 1 | 0 | 2 | 8 | 4 | 10 | 204 |

PULSE WIDTH MODULATED DISPLAY WITH EQUALIZED PULSE WIDTH SEGMENTS

CROSS REFERENCE TO RELATED APPLICATION

This application claims the benefit, under 35 U.S.C. § 365 of International Application PCT/US03/21155, filed Jul. 7, 2003, which was published in accordance with PCT Article 21(2) on Jun. 24, 2004 in English and which claims the benefit of U.S. provisional patent application No. 60/430,751 filed Dec. 4, 2002.

TECHNICAL FIELD

This invention relates to technique for operating a sequential pulse width modulated display system to reduce the incidence of motion artifacts.

BACKGROUND ART

There presently exist television projection systems that utilize a type of semiconductor device known as a Digital Micromirror Device (DMD). A typical DMD comprises a plurality of individually movable micromirrors arranged in a rectangular array. Each micromirror pivots about limited arc, typically on the order of 10°–12° under the control of a corresponding driver cell that latches a bit therein. Upon the application of a previously latched "1" bit, the driver cell causes its associated micromirror cell to pivot to a first position. Conversely, the application of a previously latched "0" bit to the driver cell causes the driver cell to pivot its associated micromirror to a second position. By appropriately positioning the DMD between a light source and a projection lens, each individual micromirror of the DMD device, when pivoted by its corresponding driver cell to the first position, will reflect light from the light source through the lens and onto a display screen to illuminate an individual picture element (pixel) in the display. When pivoted to its second position, each micromirror reflects light away from the display screen, causing the corresponding pixel to appear dark. An example of such DMD device is the DMD of the DLP™ projection system available from Texas Instruments, Dallas Tex.

Present day television projection systems that incorporate a DMD of the type described control the brightness (illumination) of the individual pixels by controlling the duty cycle during which the individual micromirrors remain "on" (i.e., pivoted to their first position), versus the interval during which the micromirrors remain "off" (i.e. pivoted to their second position). To that end, such present day DMD-type projection systems use pulse width modulation to control the pixel brightness by varying the duty cycle of each micromirror in accordance with the state of the pulses in a sequence of pulse width segments. Each pulse width segment comprises a string of pulses of different time duration. The actuation state of each pulse in a pulse width segment (i.e., whether each pulse is turned on or off) determines whether the micromirror remains on or off for the duration of that pulse. In other words, the larger the sum of the widths of the pulses in a pulse width segment that are turned on (actuated), the longer the duty cycle of each micromirror.

In a television projection system utilizing a DMD, the frame interval, i.e., the time between displaying successive images, depends on the selected television standard. The NTSC standard currently in use in the United States requires a frame interval of $\frac{1}{60}$ second whereas certain European television standards employ a frame interval of $\frac{1}{50}$ second. Present day DMD-type television projection systems typically provide a color display by projecting red, green, and blue images either simultaneously or in sequence during each frame interval. A typical sequential DMD-type projection system utilizes a motor-driven color wheel interposed in the light path of the DMD. The color wheel has a plurality of separate primary color windows, typically red, green and blue, so that during successive intervals, red, green, and blue light, respectively, falls on the DMD.

To achieve a color picture, red, green and blue light falls on the DMD at least once within each successive frame interval. If only one red, one green and one blue image is made and each consumes $\frac{1}{3}$ of the frame interval, then the large time interval between colors will produce perceptible color breakup with motion. Present day DMD systems address this problem by breaking each color into several intervals and interleaving the intervals in time, thereby reducing the delay between colors. Each color interval corresponds to a pulse width segment, with the pulse width segment for each color interleaved with the segments of the other colors. Unfortunately, breaking each color into segments often produces motion artifacts because of light redistribution effects on intensity transients. Depending on the coding scheme employed to code the pulses in the segments, an incremental increase in brightness often requires actuation of one or more pulses in at least one segment, while de-actuating one or more pulses in the same or a different segment. Actuating one or more pulses in a segment while de-actuating one or more pulses in the other segments to achieve an incremental increase in pixel brightness will limit complexity but often at the cost of visual disturbances especially at low pixel brightness levels.

Thus, there is need for a technique for reducing motion artifacts in a pulse width modulated display system attributable to light redistribution effects on intensity transients.

BRIEF SUMMARY OF THE INVENTION

Briefly, in accordance with the present principles, there is provided a technique for operating a pulse width modulated display system having a plurality of pixels each of whose illumination is controlled responsive to pulses within a sequence of pulse width segments. The state of each individual pulse in a pulse width segment determines whether the corresponding pixel remains illuminated during the interval associated with that pulse. To alter the pixel brightness within a range lying between first and second pixel brightness boundaries, the actuation state of at least one pulse in a first pulse width segment is altered (turned-on or off). To alter pixel brightness above the second pixel brightness boundary, the actuation state of least one pulse within at least one additional pulse width segment is altered, such that the at least one pulse within that additional segment is altered to make nearly equal the total width of pulses actuated (turned on) within that segment to the total pulse width de-actuated (turned off) within the same segment, when there is an incremental brightness change.

BRIEF DESCRIPTION OF THE DRAWINGS

FIG. 1 depicts a block schematic diagram of a present-day pulse width modulated display system;

FIG. 2 depicts a frontal view of a color wheel comprising part of the display system of FIG. 1; and FIGS. 3–10 collectively illustrate a pulse map depicting each of a plurality of sequences of pulse width segments that control the brightness of a corresponding color of one of the pixels within the display system of FIG. 1 to reduce motion artifacts in accordance with the present principles.

DETAILED DESCRIPTION

FIG. 1 depicts a present-day pulse width modulated sequential display system 10 of the type disclosed in the Application Report "Single Panel DLP™ Projection System Optics" published by Texas Instruments, June 2001. The system 10 comprises a lamp 12 situated at the focus of a parabolic reflector 13 that reflects light from the lamp through a color wheel 14 and into an integrator rod 15. A motor 16 rotates the color wheel 14 to place a separate one of red, green and blue primary color windows between the lamp 12 and the integrator rod 15. In an exemplary embodiment depicted in FIG. 2, the color wheel 14 has diametrically opposed red, green and blue color windows $17_1$ and $17_4$, $17_2$ and $17_5$, and $17_3$ and $17_6$, respectively. Thus, as the motor 16 rotates the color wheel 14 of FIG. 2 in a counter-clockwise direction, red, green and blue light will strike the integrator rod 15 of FIG. 1. In practice, the motor 16 rotates the color wheel 14 at a sufficiently high speed so that during a frame interval of a ¹⁄₆₀ second, red, green and blue light each strikes the integrator rod four times, yielding twelve color images within the frame interval, four red, four green and four blue that are interleaved.

Referring to FIG. 1, the integrator rod 15 concentrates the light from the lamp 12, as it passes through a successive one of the red, green and blue color windows of the color wheel 14, onto a set of relay optics 18. The relay optics 18 spread the light into a plurality of parallel beams that strike a fold mirror 20, which reflects the beams through a set of lenses 22 and onto a Total Internal Reflectance (TIR) prism 23. The TIR prism 23 reflects the parallel light beams onto a Digital Micromirror Device (DMD) 24, such as the DMD device manufactured by Texas Instruments, for selective reflection into a projection lens 26 and onto a screen 28.

The DMD 24 takes the form of a semiconductor device having a plurality of individual micromirrors (not shown) arranged in an array. By way of example, the DMD manufactured and sold by Texas Instruments has a micromirror array of 1280 columns by 720 rows, yielding 921,600 pixels in the resultant picture projected onto the screen 28. Other DMDs can have a different arrangement of micromirrors. As discussed previously, each micromirror in the DMD pivots about a limited arc under the control of a corresponding driver cell (not shown) in response to the state of a binary bit previously latched in the driver cell. Each micromirror rotates to one of a first and a second position depending on whether the latched bit applied to the driver cell, is a "1" or a "0", respectively. When pivoted to its first position, each micromirror reflects light into the lens 26 and onto the screen 28 to illuminate a corresponding pixel. While each micromirror remains pivoted to its second position, the corresponding pixel appears dark. The total duration in which each micromirror reflects light through the projection lens 26 and onto the screen 28 (the micromirror duty cycle) determines the pixel brightness.

The individual driver cells in the DMD 24 receive drive signals from a driver circuit 30 of a type well known in the art and exemplified by the circuitry described in the paper "High Definition Display System Based on Micromirror Device", R. J. Grove et al.*International Workshop on HDTV* (October 1994). The driver circuit 30 generates the drive signals for the driver cells in the DMD 24 in accordance with sequences of pulse width segments applied to the driver circuit by a processor 31. Each pulse width segment comprises a string of pulses of different time duration, the state of each pulse determining whether the micromirror remains on or off for the duration of that pulse. The shortest possible pulse (i.e., a 1-pulse) that can occur within a pulse width segment (some times referred to as a Least Significant Bit or LSB) typically has a 15-microsecond duration, whereas the larger pulses in the segment each have a duration that is larger than one LSB. In practice, each pulse within a pulse width segment corresponds to a bit (hereinafter described as a "pixel control" bit) within a digital bit stream whose state determines whether the corresponding pulse is turned on or off. A "1" bit represents a pulse that is turned on, whereas a "0" bit represents a pulse that is turned off. The total sum (duration) of the actuated pulses in all the pulse width segments for a given color controls the brightness of a corresponding pixel for that color.

The driver circuit 31 generates each of four separate pulse width segments per color for every pixel per frame. Thus, during each frame interval, the driver circuit 31 generates pixel control bits for the pulses of twelve segments, four red, four blue and four green. The transmission of the pixel control bits to the DMD 24 is synchronized with the rotation of the color wheel so that each segment for a given color corresponds to the appearance of that color for illumination on the DMD 24. To increase pixel brightness, the driver circuit 31 causes one or more pulses previously de-actuated at lower brightness levels to become actuated. Depending on the coding scheme of pulses within the pulse width segments, a pulse that was actuated at a particular brightness level could become de-actuated at a higher brightness level. De-actuating pulses within a given segment while actuating pulses in other segments to achieve an incremental increase in brightness can result in motion artifacts because of light redistribution effects on intensity transients.

In accordance with present principles, the driver circuit 31 achieves close coordination between the pulses becoming actuated (getting turned on) with the pulses becoming de-actuated (getting turned off). In particular, the driver circuit 31 coordinates the pulses that become actuated and de-actuated so as to make nearly equal the total width of pulses becoming actuated within a segment and the total width of pulses becoming de-actuated within the same segment upon an incremental change in brightness. In any case, the sum of all the pulses in the segments that are turned on, less the sum of all the pulses in the segments turned off equals the change in brightness.

Figure 3:
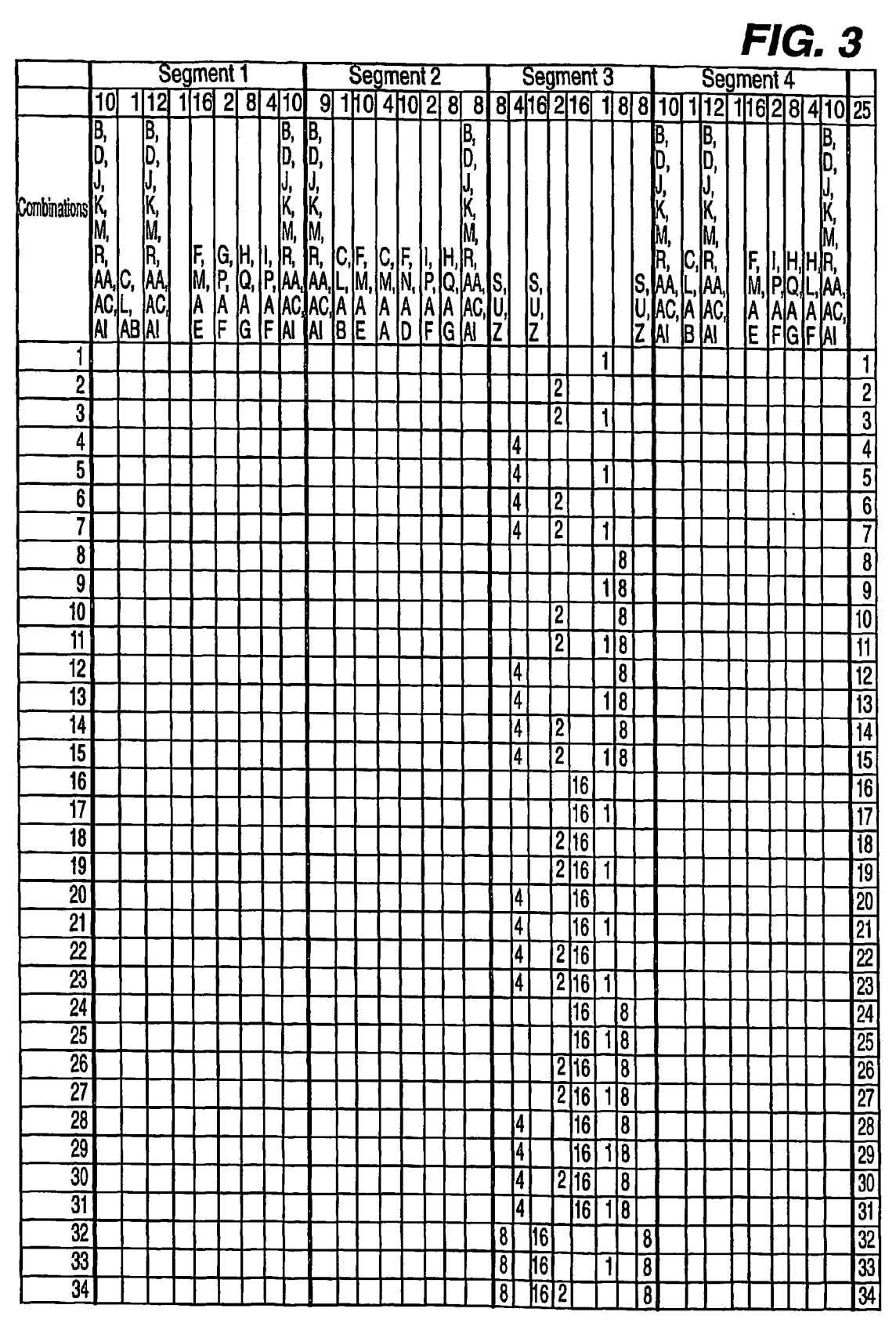

To best understand the manner in which such close coordination occurs between the pulses that become actuated and those that become de-actuated, refer to FIGS. 3–10, which collectively depict a pulse map of the pulse width segments for achieving each of brightness levels #1 to #255 (eight bit resolution) for a given color in accordance with the present principles. The darkest non-zero brightness level (level #1), which in the illustrated embodiment constitutes a first pixel brightness boundary, starts with a 1-LSB pulse in Segment 3. As the pixel brightness increases beyond brightness level #1, the actuated pulses are confined to Segment 3 for the first 63 brightness levels when employing binary coding, with brightness level #63 constituting a second brightness boundary. Within the first 63 pixel brightness levels, the total width of the pulses that become actuated within Segment 3 remain nearly equal to the pulses that become de-actuated in accordance with present principles because the pulses within the other segments remain de-actuated until reaching pixel brightness level #64.

Figure 5:
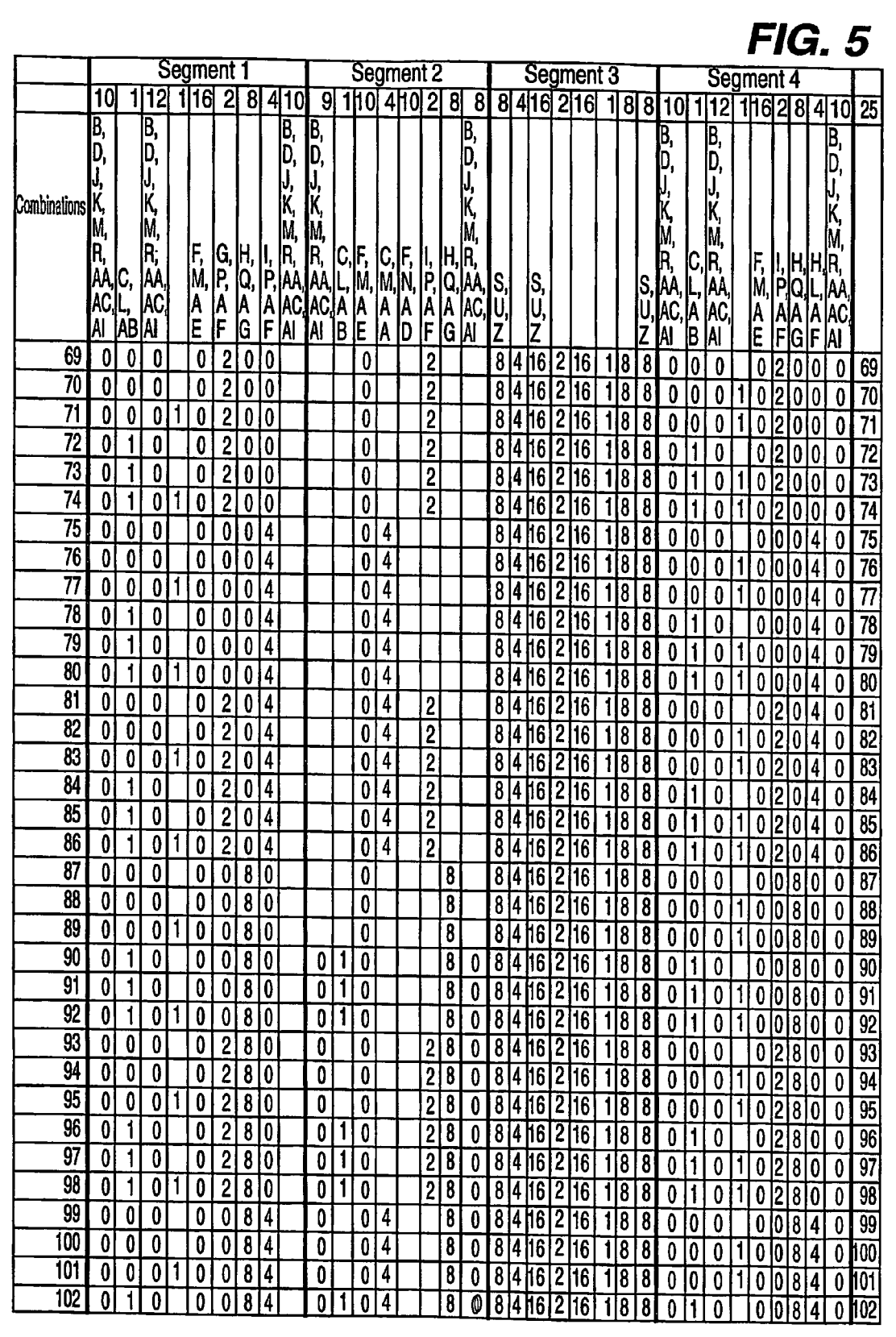
Figure 6:
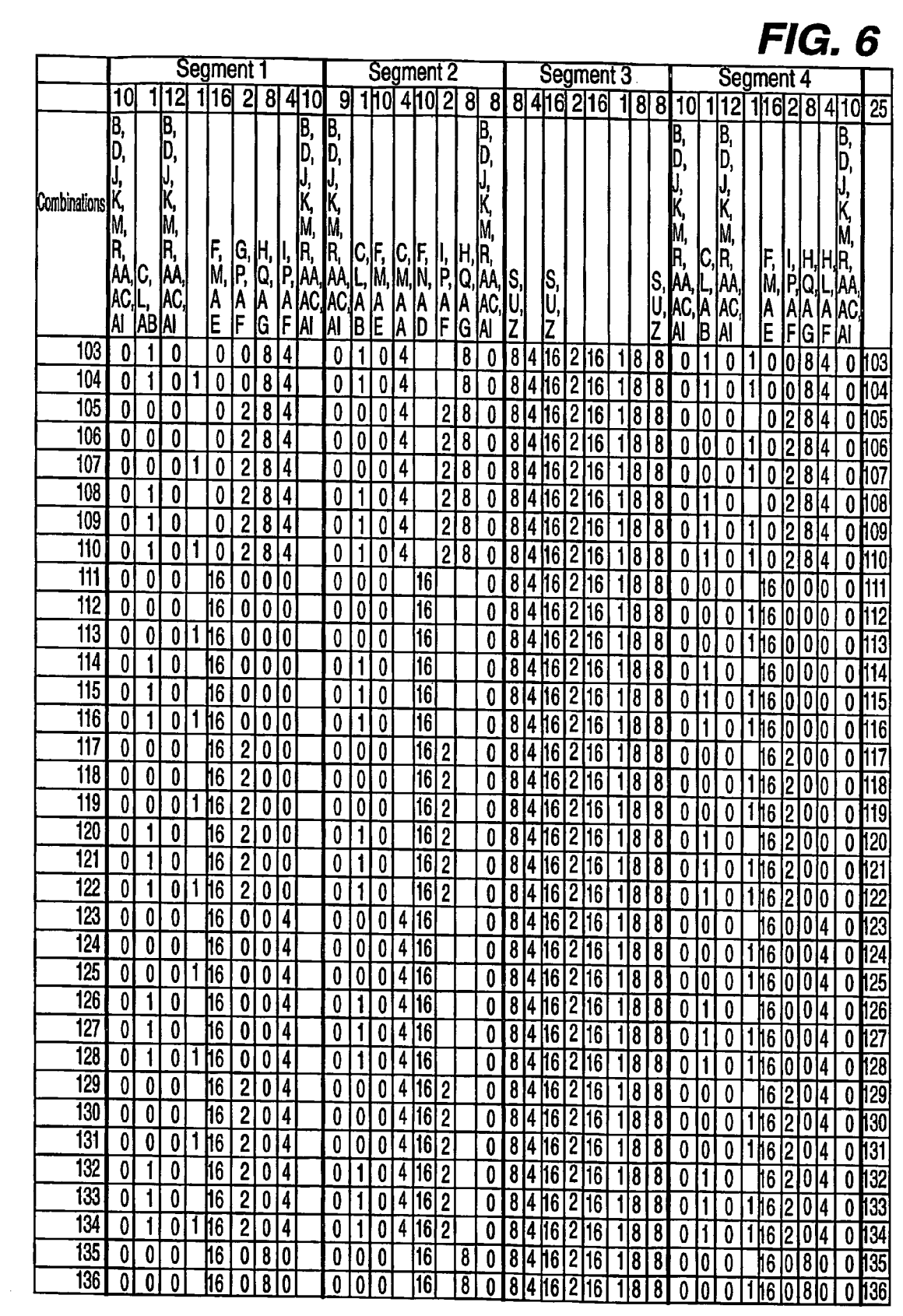
Figure 9:
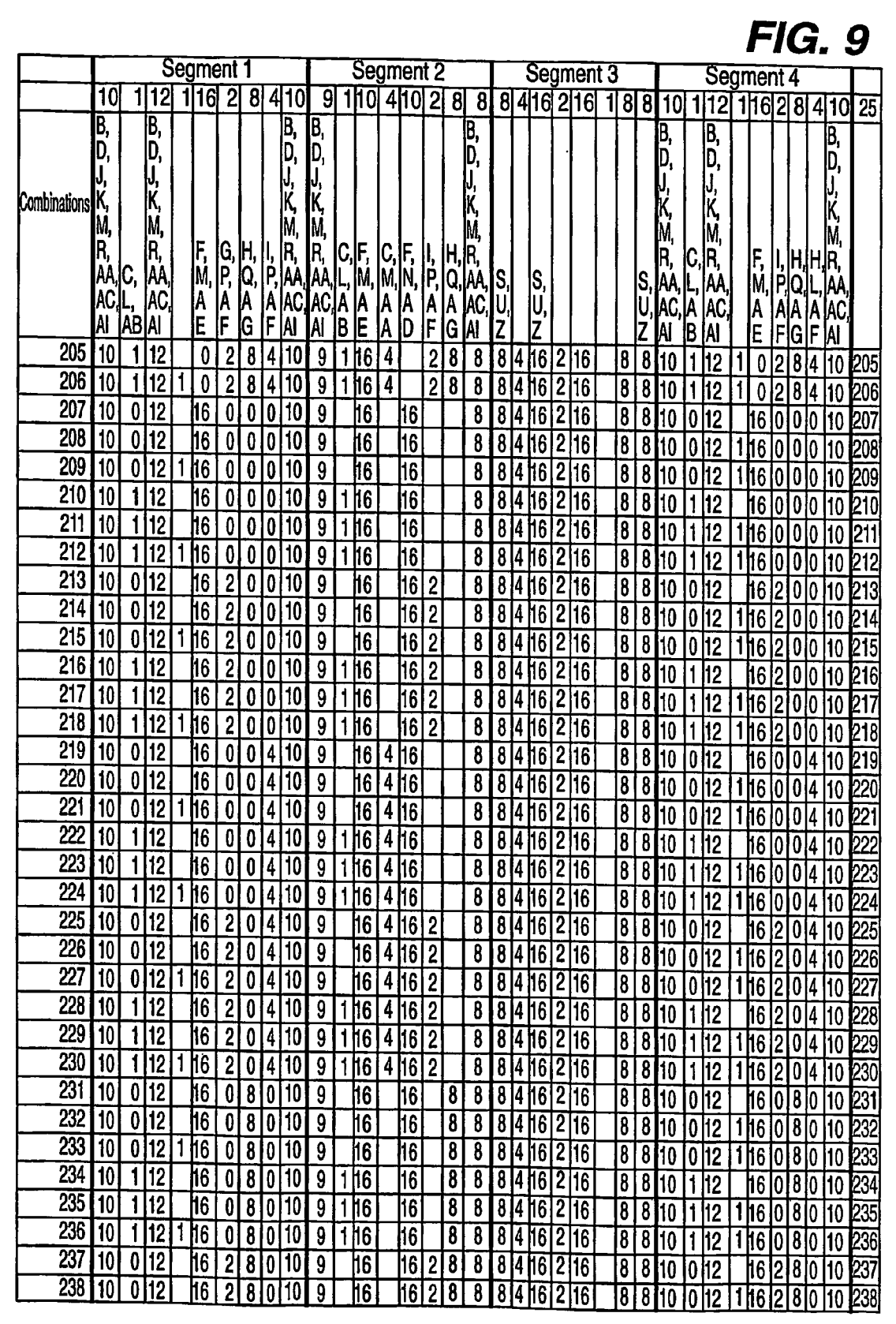
Figure 10:
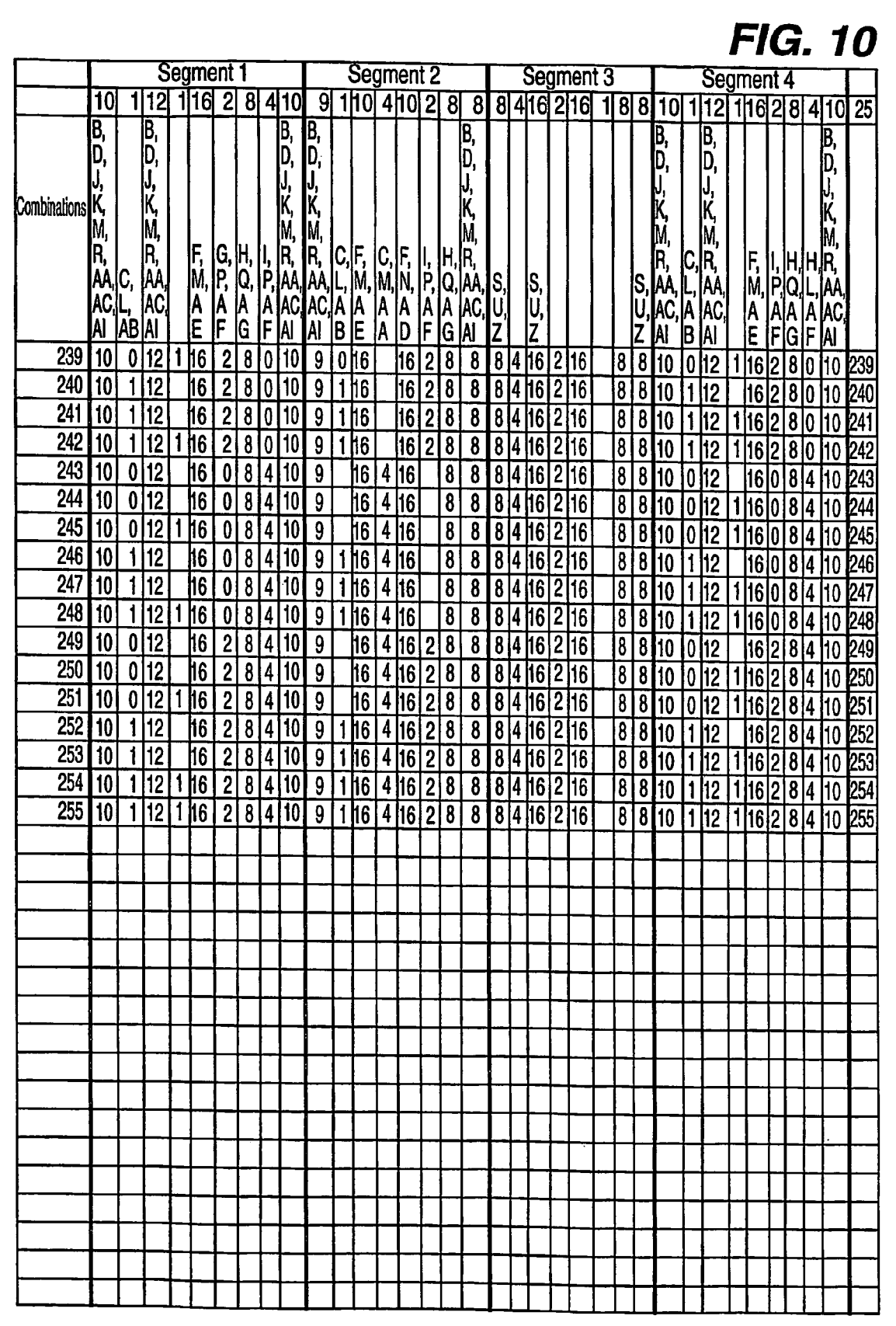

The manner in which coordination occurs between pulse actuation and de-actuation in accordance with the present principles becomes much more apparent at pixel brightness levels higher than brightness level #63. Above this pixel brightness level, there exist six pulse combinations that have pulses in Segments 1, 2, and 4. One example is the incremental transition from pixel brightness level #74 to brightness level #75 as seen in FIG. 4. To achieve such an incremental increase in pixel brightness, the combination of three 4-LSB pulses must become actuated, one in each of Segments 1, 2, and 4, while de-actuating pulses in these three segments. As can be seen from FIG. 4, in Segment 1, a 2-LSB pulse and two 1-LSB pulses become de-actuated to counterbalance the actuated 4-LSB pulse in Segment 1. The same actuation and de-actuation of pulses occurs in Segment 4. In Segment 2, a 4-LSB pulse becomes actuated while a 1-LSB pulse and a 2-LSB pulse become de-actuated. This 1-LSB difference implements the brightness increment between these two pixel brightness levels. A similar strategy achieves other incremental brightness transitions, except for one. The transition from pixel brightness level #158 to level #159, as seen in FIG. 5, includes a 1-LSB pulse de-actuated in Segment 3 with no other pulses actuated in same segment, along with Segment 2 having 33 LSB total pulses actuated while 31LSB pulses are de-actuated. This constitutes the only violation of the principle of seeking to equalize the total weight of actuated and de-actuated pulses segment by segment as illustrated in FIGS. 3–10. This violation is minor and occurs at a sufficiently high brightness so as not to be visible.

The foregoing describes a technique for reducing motion artifacts in a pulse width modulated display system by substantially equalizing the total width of pulses that become actuated and de-acted within each segment upon an incremental change in brightness.

The invention claimed is:

1. A method of operating a pulse width modulated display system having a plurality of pixels each of whose illumination is controlled responsive to the actuation state of pulses within a sequence of pulse width segments, with the state of each individual pulse in a segment determining whether the corresponding pixel remains illuminated during the interval associated with that pulse, comprising the steps of:
   altering the actuation state of at least one pulse in a first pulse width segment to alter the pixel brightness within a range lying between first and second pixel brightness boundaries; and
   altering the actuation state of at least one pulse within at least one additional pulse width segment to alter the pixel brightness above the second brightness boundary such that the at least one pulse within the at least one additional segment is altered so as to make nearly equal the total width of pulses becoming actuated within a segment, and the total pulse width becoming de-actuated within the same segment to achieve an incremental change in brightness.

2. The method according to claim 1 wherein the at least one pulse in the first segment is actuated to achieve an incremental increase in pixel brightness.

3. The method according to claim 1 wherein the at least one pulse in the first segment is de-actuated to achieve an incremental decrease in pixel brightness.

4. The method according to claim 1 wherein the at least one pulse in the at least one additional segment is actuated to achieve an incremental increase in pixel brightness.

5. The method according to claim 1 wherein the at least one pulse in the at least one additional segment is de-actuated to achieve an incremental decrease in pixel brightness.

6. The method according to claim 1 wherein the pulse width modulated display system displays a colored image by sequentially projecting each of three primary colors and wherein each color comprises a separate sequence of pulse width segments that are interleaved with those of the other primary colors.

7. A method of operating a pulse width modulated display system that displays color images, the system having a plurality of pixels each of whose illumination for a given one of a set of primary colors is controlled responsive to pulses within a sequence of pulse width segments for that color, with each segment associated with a given color interleaved with the segments associated with other colors, the state of each pulse in the segment for that color determining whether the corresponding pixel remains illuminated for that color during the interval associated with the pulse, comprising the steps of:
   altering the actuation state of at least one pulse in a first pulse width segment for a given color to increase pixel brightness within a range lying between first and second pixel brightness boundaries; and
   altering the actuation state of at least one pulse within at least one additional pulse width segment for the given color to alter the pixel brightness above the second brightness boundary such that the at least one pulse within the at least one additional segment is altered so as to make nearly equal the total width of pulses becoming actuated within a segment, to the total pulse width becoming de-actuated within the same segment to achieve an incremental change in brightness.

8. The method according to claim 7 wherein the at least one pulse in the first segment is actuated to achieve an incremental increase in pixel brightness.

9. The method according to claim 7 wherein the at least one pulse in the first segment is de-actuated to achieve an incremental decrease in pixel brightness.

10. The method according to claim 7 wherein the at least one pulse in the at least one additional segment is actuated to achieve an incremental increase in pixel brightness.

11. The method according to claim 7 wherein the at least one pulse in the at least one additional segment is de-actuated to achieve an incremental decrease in pixel brightness.

12. A method of operating a pulse width modulated display system having a plurality of pixels each of whose illumination is controlled responsive to the actuation state of pulses within a sequence of pulse width segments, with the state of each individual pulse in a segment determining whether the corresponding pixel remains illuminated during the interval associated with that pulse, comprising the step of:
   altering the actuation state of at least one pulse within at least one pulse width segment to alter the pixel brightness such that the at least one pulse within the at least one segment is altered so as to make nearly equal the total width of pulses becoming actuated within a segment, and the total pulse width of pulses becoming de-actuated within the same segment to achieve an incremental change in brightness.

13. A pulse width modulated display system comprising:
   a light source
   a projection lens for focusing incident light onto a screen a Digital Micromirror Device having a plurality of individual micromirrors arranged in an array, each micromirror pivotal about an arc in response to receipt of a drive signal applied to a driver cell associated with the micromirror to reflect light from the light source into the projection lens and onto the screen to illuminate a picture element (pixel) therein;

a rotating color wheel interposed between the light source and the digital micromirror to successively impart each of three primary colors to the light striking the digital micromirror device and reflected thereby into the projection lens;

a processor for forming sequences of pulse width segments by altering the actuation state of at least one pulse in a first pulse width segment for a given color to alter the pixel brightness within a range lying between first and second pixel brightness boundaries; and by altering the actuation state of at least one pulse within at least one additional pulse width segment to alter the pixel brightness above the second brightness boundary such that the at least one pulse within the at least one additional segment is altered so as to make nearly equal the total width of pulses becoming actuated within a segment, to the total pulse width becoming de-actuated within the same segment to achieve an incremental change in brightness; and a driver circuit responsive to the sequences of pulse width segments formed by the processor for driving the digital micromirror device to illuminate the corresponding pixel.

14. The system according to claim 13 wherein the at least one pulse in the first segment is actuated to achieve an incremental increase in pixel brightness.

15. The system according to claim 13 wherein the at least one pulse in the first segment is de-actuated to achieve an incremental decrease in pixel brightness.

16. The system according to claim 13 wherein the at least one pulse in the at least one additional segment is actuated to achieve an incremental increase in pixel brightness.

17. The method according to claim 13 wherein the at least one pulse in the at least one additional segment is de-actuated to achieve an incremental decrease in pixel brightness.

* * * * *